(12) United States Patent
Newman et al.

(10) Patent No.: US 8,502,644 B1
(45) Date of Patent: Aug. 6, 2013

(54) PHYSICAL ITEM SECURITY: TRACKING DEVICE ACTIVATION

(75) Inventors: Kurt D. Newman, Matthews, NC (US); Michael J. O'Hagan, Charlotte, NC (US); Debashis Ghosh, Charlotte, NC (US); David Joa, Pacifica, CA (US); Timothy J. Bendel, Charlotte, NC (US)

(73) Assignee: Bank of American Corporation, Charlotte, NC (US)

( * ) Notice: Subject to any disclaimer, the term of this patent is extended or adjusted under 35 U.S.C. 154(b) by 882 days.

(21) Appl. No.: 12/362,313

(22) Filed: Jan. 29, 2009

(51) Int. Cl.
*G08B 1/08* (2006.01)

(52) U.S. Cl.
USPC .................................. 340/8.1; 340/5.73

(58) Field of Classification Search
USPC ............. 340/10.1, 539.32, 8.1, 825.49, 5.73, 340/5.7
See application file for complete search history.

(56) References Cited

U.S. PATENT DOCUMENTS

| | | | |
|---|---|---|---|
| 4,164,907 A * | 8/1979 | Piatscheck et al. ............. 109/50 |
| 5,767,804 A * | 6/1998 | Murphy ................... 342/357.31 |
| 6,417,760 B1 | 7/2002 | Mabuchi et al. |
| 6,766,040 B1 | 7/2004 | Catalano et al. |
| 6,819,218 B2 | 11/2004 | Mabuchi et al. |
| 6,819,219 B1 | 11/2004 | Bolle et al. |
| 6,873,713 B2 | 3/2005 | Okazaki et al. |
| 6,902,108 B1 | 6/2005 | Chapman |
| 6,963,659 B2 | 11/2005 | Tumey et al. |
| 7,081,819 B2 | 7/2006 | Martinez De Velasco Cortina et al. |
| 7,155,035 B2 | 12/2006 | Kondo et al. |
| 7,212,114 B2 | 5/2007 | Yui et al. |
| 7,212,655 B2 | 5/2007 | Tumey et al. |
| 7,259,673 B2 | 8/2007 | Deeds |
| 7,267,262 B1 | 9/2007 | Brown |
| 7,486,806 B2 | 2/2009 | Azuma et al. |
| 7,512,254 B2 | 3/2009 | Vollkommer et al. |
| 7,519,199 B2 | 4/2009 | Kondo et al. |
| 7,599,526 B2 | 10/2009 | Ono et al. |
| 7,634,118 B2 | 12/2009 | Matsuda et al. |
| 7,639,846 B2 | 12/2009 | Yoda |
| 7,664,295 B2 | 2/2010 | Kondo et al. |
| 7,664,652 B2 | 2/2010 | Piccionelli et al. |
| 7,671,746 B2 | 3/2010 | Martinez De Velasco Cortina et al. |

(Continued)

FOREIGN PATENT DOCUMENTS

WO   WO 2008/063911 A2   5/2008

OTHER PUBLICATIONS

Hurd, Scott and Williams, Tim, "The Convergence of IT and Physical Security Systems", Nortel Journal, Issue 3, pp. 13-19.

*Primary Examiner* — Jennifer Mehmood
*Assistant Examiner* — Yong Hang Jiang
(74) *Attorney, Agent, or Firm* — Michael A. Springs; Moore & Van Allen PLLC; Esther F. Queen

(57) ABSTRACT

Embodiments of the present invention relate to systems and methods for tracking an item by concealing a tracking device in the item and activating the tracking device when the item is relocated or accessed without authorization. In particular, according to some embodiments, a system is provided for tracking the geographic location of a physical item that is stored in a controlled area and then later removed from the controlled area. An exemplary system comprises: an inner sensor located proximate to a perimeter of the controlled area; an outer sensor located between the perimeter and the inner sensor; and a tracking device associated with the physical item, wherein the tracking device is triggered when the physical item passes by the inner sensor and then the outer sensor.

25 Claims, 3 Drawing Sheets

U.S. PATENT DOCUMENTS

| | | |
|---|---|---|
| 7,932,824 B2 | 4/2011 | Flores et al. |
| 8,009,873 B2 | 8/2011 | Chapman |
| 2002/0035542 A1 | 3/2002 | Tumey et al. |
| 2002/0070856 A1* | 6/2002 | Wolfe .......................... 340/540 |
| 2002/0167393 A1 | 11/2002 | Mabuchi et al. |
| 2003/0215114 A1 | 11/2003 | Kyle |
| 2004/0066273 A1 | 4/2004 | Cortina et al. |
| 2004/0193893 A1 | 9/2004 | Braithwaite et al. |
| 2004/0210515 A1* | 10/2004 | Hughes .......................... 705/39 |
| 2005/0089197 A1 | 4/2005 | Iwasaki et al. |
| 2005/0089198 A1 | 4/2005 | Ono et al. |
| 2005/0108164 A1 | 5/2005 | Salafia, III et al. |
| 2005/0144134 A1 | 6/2005 | Hirano |
| 2005/0152583 A1 | 7/2005 | Kondo et al. |
| 2005/0212654 A1 | 9/2005 | Yoda |
| 2006/0007005 A1 | 1/2006 | Yui et al. |
| 2006/0059052 A1 | 3/2006 | Piccionelli et al. |
| 2006/0064354 A1 | 3/2006 | Piccionelli et al. |
| 2006/0064355 A1 | 3/2006 | Piccionelli et al. |
| 2006/0064358 A1 | 3/2006 | Piccionelli et al. |
| 2006/0259472 A1 | 11/2006 | MacClellan |
| 2007/0189585 A1 | 8/2007 | Sukegawa et al. |
| 2008/0079580 A1 | 4/2008 | Shelton et al. |
| 2008/0088454 A1 | 4/2008 | Flores et al. |
| 2008/0189161 A1 | 8/2008 | Daily et al. |
| 2009/0027207 A1 | 1/2009 | Shelton et al. |
| 2009/0051489 A1 | 2/2009 | Kim |
| 2009/0141948 A1 | 6/2009 | Nakaoka et al. |
| 2009/0237208 A1 | 9/2009 | Tsukahara et al. |
| 2009/0278658 A1 | 11/2009 | Higashiyama |
| 2009/0322537 A1 | 12/2009 | Tapp et al. |
| 2010/0102929 A1 | 4/2010 | Haumann |
| 2010/0138668 A1 | 6/2010 | Tsuria et al. |
| 2010/0141380 A1 | 6/2010 | Pishva |
| 2010/0164684 A1 | 7/2010 | Sasa et al. |
| 2010/0228726 A1 | 9/2010 | Slinker et al. |

* cited by examiner

PHYSICAL ITEM SECURITY: TRACKING DEVICE ACTIVATION

FIELD

In general, embodiments of the present invention relate to systems and methods for tracking an item by concealing a tracking device in the item and activating the tracking device in the event the item is removed from a designated area or accessed without authorization.

BACKGROUND

To increase customer convenience, banks commonly provide drop boxes in which customers can place legal documents and cash deposits when the bank is closed. These drop boxes are typically located at banking centers or remote locations. Individuals that have committed or that have been legally convicted of an unlawful activity frequently steal from drop boxes. For example, an individual that has committed or that has been legally convicted of an unlawful activity may visit a drop-box location, force open the door of the drop box, and insert hooks into the drop box to hook and pullout packages. Some individuals that have committed or that have been legally convicted of an unlawful activity have knowledge of how the drop boxes are manufactured. Accordingly, these individuals that have committed or that have been legally convicted of an unlawful activity bring the correct tools to apply sufficient force at the correct locations to compromise the integrity of the drop box. The most common counter measure used by banks to thwart these individuals that have committed or that have been legally convicted of an unlawful activity is to manufacture stronger and more secure drop boxes. For example, some manufacturers are making the drop boxes out of heavier gauge steel and/or redesigning the door of the drop box.

SUMMARY

Embodiments of the present invention relate to systems and methods for tracking an item by concealing a tracking device in the item and activating the tracking device when the item is relocated or accessed without authorization. In particular, according to some embodiments, a system is provided for tracking the geographic location of a physical item that is stored in a controlled area and then later removed from the controlled area. An exemplary system comprises: an inner sensor located proximate to a perimeter of the controlled area; an outer sensor located between the perimeter and the inner sensor; and a tracking device associated with the physical item, wherein the tracking device is triggered when the physical item passes by the inner sensor and then the outer sensor.

An embodiment of the present invention provides a system for tracking the geographic location of a physical item that is stored in a controlled area and then later removed from the controlled area. The system comprises an inner sensor located proximate to a perimeter of the controlled area; an outer sensor located between the perimeter and the inner sensor; and a tracking device associated with the physical item, wherein the tracking device is triggered when the physical item passes by the inner sensor and then the outer sensor.

Another embodiment of the present invention provides a method of tracking the geographic location of a physical item that is stored in a controlled area and then later removed from the controlled area. The method comprises associating a tracking device with the physical item; locating an inner sensor proximate to a perimeter of the controlled area; locating an outer sensor between the perimeter and the inner sensor; and triggering the tracking device when the physical item passes by the inner sensor and then the outer sensor.

Yet another embodiment of the present invention provides a system for tracking the geographic location of a physical item that is stored in a controlled area and then later removed from the controlled area. The system comprises an input system; a tracking device associated with the physical item; an inner sensor in communication with the input system and disposed in an inner position proximate to a perimeter of the controlled area, wherein the inner sensor is configured to send an inner-position signal to the input system when the tracking device of the physical item passes by the inner position; an outer sensor disposed in an outer position between the perimeter and the inner sensor, wherein the outer sensor is configured to send an outer-position signal to the input system when the tracking device of the physical item passes by the outer position; a processing system in communication with the input system and configured process the sequence of the inner- and outer-position signals and to generate an activation signal when the tracking device of the physical item passes by the inner position and then passes by the outer position; and an output system in communication with the processing system and configured to send the activation signal to the tacking device.

Still another embodiment of the present invention provides a tracking device associated with a physical item and configured to activate when the physical item is removed from a controlled area, the controlled area has inner and outer sensors, the inner sensor located proximate to a perimeter of the controlled area, the outer sensor located between the perimeter and the inner sensor. The tracking device comprises an input system configured to receive an inner-position signal when the tracking device passes by the inner sensor and an outer-position signal when the tracking device passes by the outer sensor; a processing system configured process the sequence of the inner- and outer-position signals and to generate an activation signal when the tracking device of the physical item passes by the inner position and then passes by the outer position; and an activation system configured to receive the activation signal from the processing system and activate the tracking device.

BRIEF DESCRIPTION OF THE DRAWINGS

Figure 1:
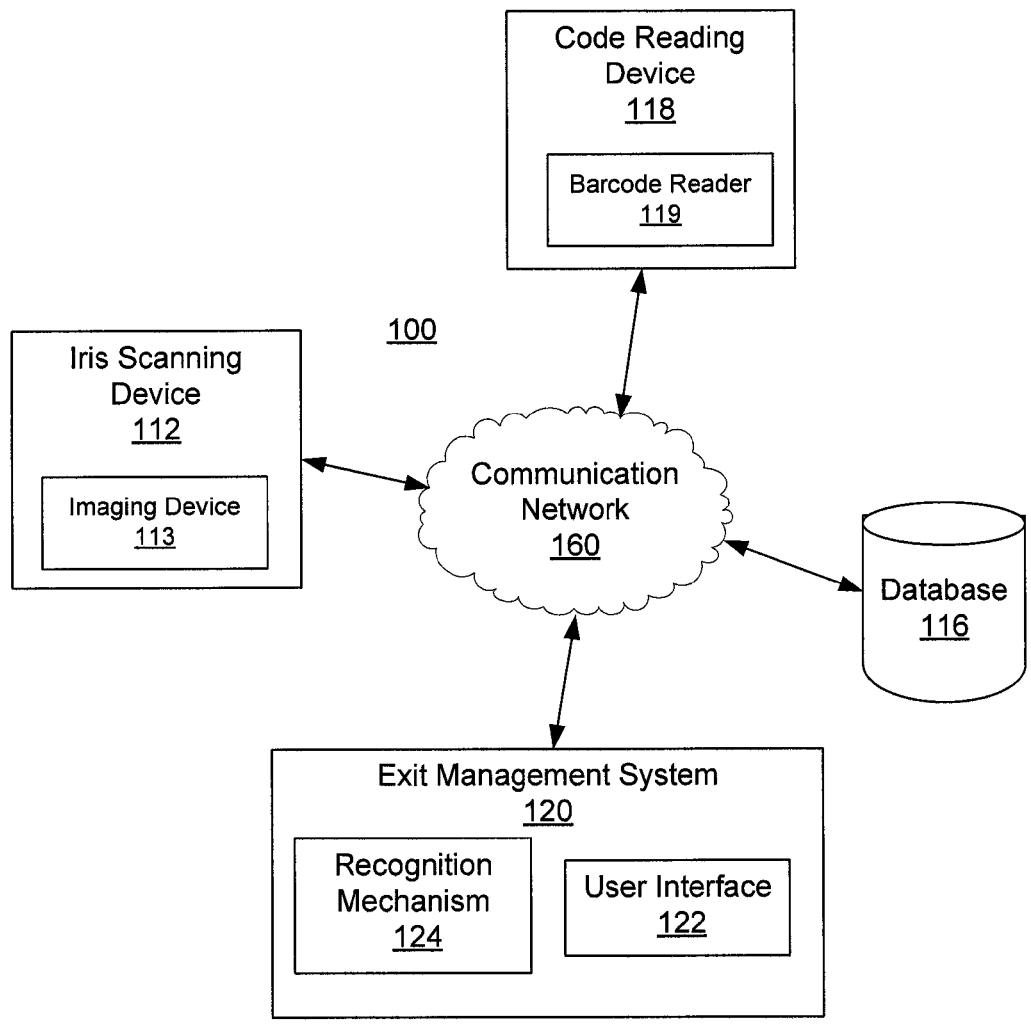
Figure 2:
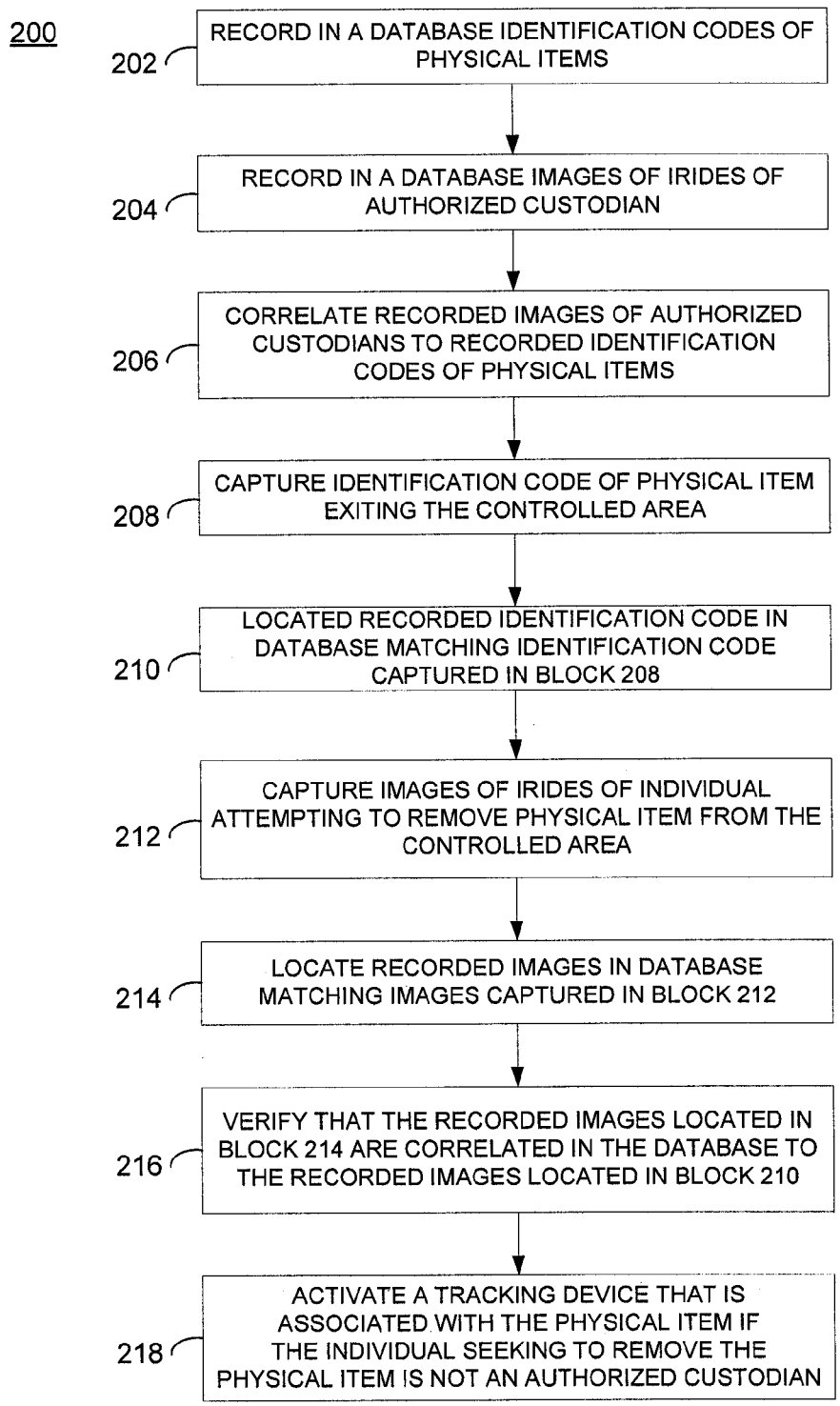
Figure 3:
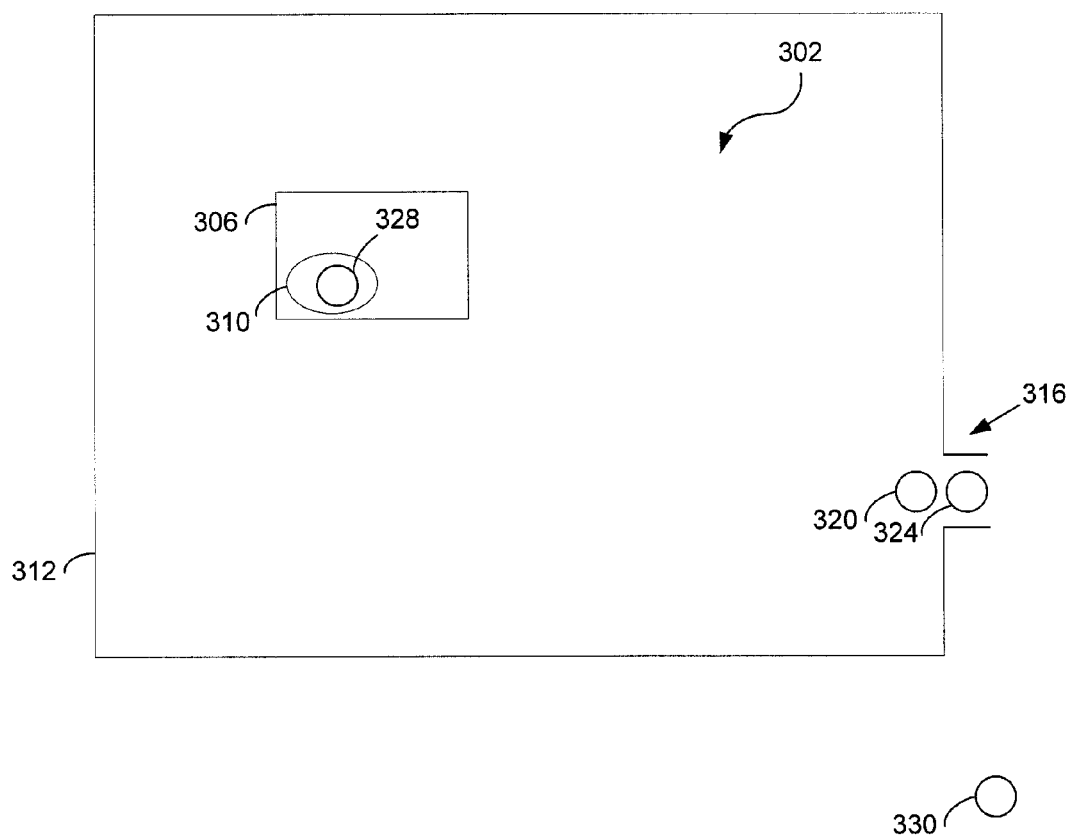

Having thus described embodiments of the invention in general terms, reference will now be made to the accompanying drawings:

FIG. 1 illustrates an environment in which the processes described herein are implemented according to one embodiment of the invention;

FIG. 2 is a flow chart illustrating an exemplary process of authenticating the identity of an individual authorized to remove a physical item from a controlled area; and FIG. 3 illustrates another environment in which the processes described herein are implemented according to one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method, system, computer program product, or a combination of the foregoing. Accordingly, the present invention may take the form of a software embodiment (including firmware, resident software, microcode, etc.) or an embodiment combining software and hardware aspects that may generally be referred to herein as a "system." Furthermore, embodiments of aspects of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semi-conductor system, apparatus, device, or propagation medium. More specific examples of the computer-readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

FIG. 1 illustrates an exemplary physical item security system 100, in accordance with an embodiment of the invention. With regard to FIG. 2, a flow chart is provided that illustrates an exemplary procedure 200 for authenticating the identity of an individual authorized to remove a physical item from a controlled area. As a primary matter, and in accordance with some embodiments, the physical item security system 100 and procedure 200 described herein operate within the greater environment of a controlled area that permits only certain authorized custodians to remove certain physical items from the controlled area. In some situations, such physical items may be valuable or otherwise important items, which are stored in the controlled area for security and anti-theft purposes. These physical items may be, for example, money, jewels, family heirlooms, legal documents, etc. However, it should be understood that it is not necessary that a physical item be considered valuable or important. By way of example, environments in which the physical item security system 100 may operate include vaults, drop boxes, secured rooms or buildings, and any other facility having a need for authenticating the identity of an individual attempting to remove physical items therefrom. It should also be appreciated that the environments in which the physical item security system 100 may operate include computers, other programmable data processing apparatuses, databases, computer-readable memory, networks, computer program products, software, firmware, resident software, micro-code, and computer program products on computer-readable medium having computer-usable program code embodied in the medium.

With regard to the particular components of the physical item security system 100, and in accordance with one embodiment of the present invention, an iris scanning device 112, a database 116, and an exit management system 120 are in communication over a communication network 160. The communication network 160 could be a wide area network, including the Internet, a local area network or intranet, a wireless network, etc. It should be understood that when two components are described herein as communicating over a network, the components may be directly coupled to each other, or indirectly coupled via one or more other components. Furthermore, although the system is described herein as comprising several unique components, these components need not be separate and distinct from one another, and two or more of such components may, in some embodiments, be combined into a single component that performs all of the functions of the multiple components so combined as described herein.

Turning to the iris scanning device 112, in some embodiments the iris scanning device 112 comprises an imaging device 113, such as a camera, and is configured to capture high-resolution images of the irides of an individual's eyes. When the procedure 200 provides for images of an individual's irides to be captured, it should be understood that the individual whose irides are being scanned may cooperate with the iris scanning process, for example by standing still and staring into the imaging device 113, to allow the iris scanning device 112 to capture the images, or the images may be captured covertly, whereby the individual is unaware that the iris scanning device 112 is capturing the images. Additionally, the iris scanning device 112 may take only one image of one iris of the individual that it is scanning, or it may take multiple images of one iris or both irides of the individual. In accordance with one embodiment of the present invention, the iris scanning device 112 is further configured to transmit the captured images to the database 116, to the exit management system 120, or both.

It should be appreciated that instead of, or in addition to, the iris scanning device, the physical item security system 100 can include other biometric devices used for obtaining biometric information, other than iris images. For example, a biometric device could be provided for reading finger prints. Further, it should be appreciated that instead of, or in addition to, the iris scanning device, the physical item security system 100 can include other identification devices used for obtaining information, other than biometric information. For example, a keycard reader could be provided for reading individuals' badges, ID cards, etc, or a computer terminal having a keyboard and being linked to a network may be provided for verifying individuals' login IDs and passwords.

Turning to the code reading device 118, in some embodiments the code reading device 118 comprises barcode reader 119 and is configured to read identification codes associated with the physical items. When the procedure 200 provides for reading or capturing identification codes of the physical items, it should be understood that the physical items whose identification codes are being read may be stationary, for example placed in front of the code reading device 118 to allow the barcode reader 119 to capture and read the identification code, or the identification codes may be read covertly, whereby the individual handling the physical item from the controlled area is unaware that the code reading device 118 is capturing and reading the identification codes. In accordance with one embodiment of the present invention, the code reading device 118 is further configured to transmit the captured and read identification codes to the database 116, to the exit management system 120, or both.

According to some embodiments, a physical item is placed in the controlled area, and the code reading device 118 reads the identification code of the physical item. Alternatively, the exit management system 120 may obtain the identification code of the physical item through other sources, such as a public third party database. In accordance with either of the foregoing embodiments, and as set forth in block 202, the identification code of the physical item is recorded in the database 116 so that it may be retrieved and/or accessed by the exit management system 120 in the future. According to one embodiment, the exit management system 120 comprises a user interface 122 that allows a facility exit manager to access the database 116 and enter information that may be stored in the database 116. The "exit manager" is not necessarily an employee of the entity responsible for maintaining the controlled area and the functions performed by the exit manager may be performed by multiple people, or may be automated. In this regard, in one embodiment the "exit manager" comprises a computing device operating computer-readable instructions for performing the functions of the exit manager described herein. According to some embodiments, the exit manager's role is to manage the entry and exit of a physical item to and from the controlled area by utilizing the user interface 122 of the exit management system 120. In particular, the exit manager may enter identifying information and other relevant information and data about the physical item to be stored in the database 116 and related to the identification code of the physical item.

It should be appreciated that, according to some embodiments of the invention, the identifying information of the physical item may be stored in the database 116 prior to reading and capturing the identification code of the physical item, or the identification codes and the other identifying information may be stored in the database 116 at the same time. According to one embodiment, the code reading device 118 is configured to transmit the identifying codes of the physical items to the exit management system 120, where the exit manager, through the user interface 122, can cause the identification codes to be stored in the database 116 in such a way that they are correlated or linked to the other identifying information about the physical item, where the other identifying information is already stored in the database 116. Therefore, the database 116 essentially stores a "profile" of the physical item, including the identification codes of the physical item and the other identifying information of the physical item, including, for example, a physical description, the value, the owner's name and address, etc. However, according to another embodiment of the invention, no identification codes are captured or stored in the profile of the physical item in the database 116, and the profile of the physical item only includes the other identifying information relating to the physical item as input to the database by the exit manager.

According to some embodiments of the invention, the exit manager establishes that an individual is authorized to remove the physical item from the controlled area. Individuals so authorized will be referred to herein as "authorized custodians." A physical item may have more than one authorized custodian. It is within the discretion of the management of the particular facility responsible for securing the physical item to establish certain criteria for determining whether an individual is an authorized custodian. For example, where the invention is practiced in a bank vault, the management of the bank and the owner of the physical item may decide that an individual is established as an authorized custodian of a physical item stored in the bank's vault if the individual is an owner of the physical item, if the individual is an employee designated by the bank as being responsible for administering the contents of the bank's vault, if the individual has been authorized in a written document signed by an owner of the physical item naming the individual and that individual presents to the management of the bank forms of identification sufficient to establish, in the management's discretion, that the individual is, in fact, the individual named in the owner's written authorization. It should be understood that the foregoing example is for illustrative purposes only, and each facility responsible for securing the physical item may have different criteria for establishing whether an individual is an authorized custodian of a particular physical item.

According to one embodiment, once the determination has been made that a particular individual is an authorized custodian of a physical item stored in the controlled area and having a profile in the database 116, the exit manager, through the user interface 122, manages the collection and/or entry of identifying information about the authorized custodian, including, for example, the authorized custodian's name, photograph, date of birth, address, etc. According to some embodiments, the exit management system 120 stores this information in the database 116. The information may be stored as a separate profile for the authorized custodian that is linked or correlated to the particular physical item's profile within the database 116, or it may be stored as part of the particular physical item's profile in the database 116. In addition, in some embodiments, the authorized custodian's profile may be stored in the database prior to the storage of the associated physical item's profile. In that situation, the exit manager would ensure that the physical item's profile, when added to the database, was linked to the authorized custodian's profile.

In accordance with some embodiments, high-resolution images of the irides of established authorized custodian(s) for a physical item stored in a controlled area are captured. The iris scanning device 112 is configured to capture the images and transmit those images to the exit management system 120 and/or the database 116. Alternatively, and in accordance with other embodiments, the exit management system 120 may be capable of obtaining iris images of the authorized custodian from another source, for example a public database of iris images. Ultimately, the iris images of the authorized custodian are stored in the database, as set forth in block 204, and are correlated to the profile of the physical item, as represented by block 206. A single physical item may have multiple authorized custodians, in which case the profile of the physical item in the database is linked to multiple profiles associated with the authorized custodians.

In some embodiments, the iris images may be presented to the exit manager prior to being stored in the database 116, or may be directly stored in the database 116 to be accessed later by the exit manager and linked to a profile. According to different embodiments, the exit manager may create an entire profile for the authorized custodian, including the iris images and any identifying information regarding the authorized custodian that the administrators of the controlled area determine to be relevant, and store the entire profile at one time, or the iris images may be stored in connection with an already existing stored profile, or the iris images may be stored without accompanying information, which may be added later. The order of storage of information and images in the database is not important, and the various operations may be performed in different orders in accordance with different embodiments of the present invention.

When an individual attempts to remove the physical item from the controlled area, according to some embodiments, the exit management system 120 is configured to prevent the individual from removing the physical item from the controlled area, unless an authorized custodian presents himself and has his identity authenticated by the exit management system 120. In accordance with one embodiment of the present invention, and as set forth in block 208, upon an individual's attempt to remove the physical item from the controlled area, the code reading device 118 reads the identification code of the physical item and transmits the identification code to the exit management system 120.

According to one embodiment, the exit management system 120 comprises a recognition mechanism 124 configured to analyze the identification code, search the identification codes stored in the database 116, and locate the identification code stored in the database 116 that matches the captured identification code. As set forth in block 210, and in accordance with certain embodiments, the identification codes stored in the database 116 are compared to the captured identification code and a stored identification code is located that matches the captured identification code. In particular, according to one embodiment of the present invention, the identification codes stored in the database 116 are compared to the captured identification code by employing the recognition mechanism 124. Indeed, when it is provided herein that two identification codes should be compared, or that a match for a particular identification code should be located, it should be appreciated that such language encompasses comparing the identification codes, as they may be converted into any form (not just comparing the code read off of the physical item) and locating a match by comparing such converted codes.

In the event no matching stored identification codes are located, in accordance with one embodiment, the exit management system 120 may return an error message through the user interface 122 in order to alert the exit manager that the physical item that the individual is attempting to remove from the controlled area is not a known physical item with a stored profile. The exit manager may then take steps to set up a profile for the physical item and the associated authorized custodians. If the search of the database 116 does locate matching stored identification codes, the exit management system 120 determines that the physical item that the individual is attempting to remove from the controlled area is the physical item described in the stored profile containing the matching identification code. According to some embodiments, the exit management system 120 accesses the profile in the database 116 containing the matching identification code, and identifies the corresponding profile(s) of the authorized custodian(s) of the physical item that are linked to or contained within the physical item's profile.

According to embodiments of the present invention where a physical item was not given an identification code (in some embodiments because fixing an identification code to the physical item may impair or damage the physical item) or where identification codes of the physical items were never stored in the physical item's profile in the database 116, no identification code of the physical item will be captured and read upon an individual attempting to remove the physical item from the controlled area. In accordance with such embodiments, the exit manager will employ alternative methods to locate and access the profile of the physical item, including by direct observation. Such embodiments of the present invention may be preferable in a relatively small controlled area where the management of the facility responsible for administering the controlled area is intimately familiar with the physical item stored in the controlled area, and it is inconvenient or difficult to assign identification codes to each of the physical items.

Next, in accordance with some embodiments, and as set forth in block 212, images of the irides of an individual presenting himself at the facility and attempting to remove the physical item from the controlled area are captured. According to one embodiment, the iris scanning device 112 captures the images of the irides of the individual presenting himself at the facility and transmits the captured images to the exit management system 120. According to one embodiment, the exit management system 120, utilizing the recognition mechanism 124, analyzes the captured images, compares the captured images (or a template generated from the captured images) to the iris images of the authorized custodian(s) of the physical item (or templates thereof) by accessing the profiles of the authorized custodian(s) that were previously identified, and determines whether the captured iris images of the individual attempting to remove the physical item match any of the iris images stored in the database 116 in the profiles of the authorized custodian(s) of the physical item.

Alternatively, and according to another embodiment of the invention, the exit management system 120 may compare the captured iris images (of the individual attempting to remove the physical item) to all stored iris images (of all of the authorized custodians of all of the physical items stored in the controlled area) in the database 116, rather than just those stored iris images located in the profiles of the authorized custodians linked to the profile of the physical item. According to either of the foregoing embodiments, and as set forth in block 214, stored iris images in the database 116 are located that match, based on the determination of the recognition mechanism 124, the captured iris images.

After locating a match in the database 116, and as represented by block 216, the exit management system 120 verifies that the located stored iris images are correlated in the database 116 to the stored identification code that matches the captured identification code of the physical item being removed from the controlled area, as located prior. Alternatively, the exit management system 120 may confirm that the located profile containing the matching stored iris images is correlated to the profile of the physical item being removed from the controlled area (the profile for the physical item has already been accessed as discussed above).

In the event the exit management system 120 determines that the captured iris images match the iris images stored in the profile of an authorized custodian of the physical item, then the exit management system 120 determines that the individual presenting himself at the facility and attempting to remove the physical item from the controlled area is in fact an authorized custodian of the physical item and allows the authorized custodian to remove the physical item from the controlled area.

On the other hand, if the exit management system 120 does not locate a match for the captured iris images that are included in the set of iris images of authorized custodians stored in the database 116 and linked to the physical item's profile, then the exit management system 120, according to some embodiments, does not allow removal of the physical item from the controlled area and returns an error message to the exit manager, so that the exit manager can take action to resolve the problem, whether by allowing the individual to become an established authorized custodian within the exit management system 120 by complying with the facility's criteria (as determined in the facility's sole discretion), by contacting an authorized custodian of the physical item or local authorities, by preventing removal of the physical item until an authorized custodian having a profile in the database appears in person to remove the physical item, or otherwise. If the unauthorized individual manages to thwart the exit management system 120 and covertly or forcefully removes the physical item from the controlled area, then, as represented at block 218, the exit management system 120 is configured to activate a tracking device, such as a GPS tracking device, associated with the physical item. The tracking device is then used to track the geographic location of the physical item. The exit management system 120 can be further configured to activate an alarm and notify law enforcement, which can utilize the geographic-location information provided by the tracking device to recover the physical item.

For example, in some embodiments, the exit management system 120 is administered by a bank to secure customers' property. In this embodiment, customers place their physical items in a bank-provided package, which contains a hidden tracking device. Because the tracking device is concealed in the package, customers are unaware of the tracking device. This will ensure that the tracking device is not inadvertently left out of the package or that the tracking device is not intentionally omitted by individuals that could be in collusion with individuals that have committed or that have been legally convicted of an unlawful activity. In other embodiments, the tracking device is concealed on or in the physical item itself. For example, the tracking device could be concealed within a "band" used to bundle dollar bills together, inside of a coin roll sleeve, or another suitable item, or the tracking device could be concealed within the physical item, such as materials within collateral vaults, confidential documentation, and computers.

In some embodiments, if the physical item contains multiple tracking devices, that activate one at a time. When the battery is exhausted for the first tracking device, another one begins to transmit a tracking signal. Each tracking device is activated sequentially to provide additional time for law enforcement officials to locate the physical item.

It should be appreciated that the order of the procedure as described hereinabove may vary in accordance with different embodiments of the invention. For example, the iris scanning device 112 may capture the images of the irides of the individual attempting to remove the physical item prior to capturing the identification code of the physical item, and the profile of the authorized custodian may be located and/or accessed prior to locating or accessing the profile of the physical item. In that case, the exit management system 120 would be configured to utilize the link established within the database 116 between the stored profile of the authorized individual and the profile of the physical item to identify the physical item associated with the identified authorized custodian.

According to some embodiments of the present invention, the exit management system 120 is also configured to manage entry of physical items that have been previously stored in the controlled area. In accordance with one embodiment, when a physical item is presented for storage at the facility, the code reading device 118 reads the identification code of the physical item prior to allowing storage of the physical item. The exit management system 120 is configured to compare the captured identification code to the stored identification codes of known physical items stored in the database 116 using the recognition mechanism 124. If a matching identification code is located and relates to the profile of a physical item having an active account within the facility, the exit management system 120 is configured to allow storage of the physical item. On the other hand, if no matching identification code is located, or if a matching identification code is located but relates to a profile containing problematic information (as determined by management of the facility), storage in the facility is refused and an error message is returned to the exit manager through the user interface 122, so that the exit manager may address the missing profile in accordance with the facility's particular policies and designated processes.

At the time of storage, according to one embodiment, the iris scanning device 112 captures high-resolution images of the irides of an individual presenting the physical item for storage. As described herein, the captured images may be analyzed and compared to the images stored in the database 116 in order to locate a match. In the event the exit management system 120 is unable to locate a matching set of stored images in the profile of an authorized custodian that is linked to the profile of the particular physical item being presented for storage (as identified using the recognition mechanism 124), then the exit management system 120 will record this discrepancy, allow storage of the physical item, and present a message to the exit manager so that the exit manager can determine whether the individual presenting the physical item for storage should be a recognized authorized custodian for that physical item, in which case the exit manager could begin the process of creating a profile for the authorized custodian to be stored in the database 116 and linked to the physical item's profile. Alternatively, the facility may determine that storage of the physical item should not be allowed under such circumstances, in which case the exit management system 120 will deny storage. Indeed, the manner in which the facility chooses to address a failure of the exit management system 120 to locate a match is entirely within the discretion of the management of the facility.

It should be appreciated that the components of the system described herein are capable of performing additional functions that are beneficial to the identity authentication process. For example, and as discussed above, according to some embodiments, profiles are initially created and stored in the database 116 for each physical item stored in the facility and each authorized custodian authorized to remove/present the physical item from/to the controlled area of the facility. These profiles contain the iris images of the particular individual, as well as other identifying and relevant information as determined by the management of the facility.

According to an embodiment of the invention, the other information is manually entered into the database 116 and added to the particular custodian's or physical item's profile by the exit manager. This information may include a physical description of the individual, a list of physical items for which the individual is an authorized custodian, the individual's identification credentials, etc. In accordance with one embodiment, the iris scanning device 112 is configured to take photographs of the authorized custodians that may be stored in connection with the iris images in the applicable profiles in the database 116 by the exit management system 120. According to another embodiment, the exit management system 120 comprises an identification scanning mechanism configured to read, copy or scan identification credentials provided by the authorized custodian, and the exit management system 120 may be further configured to store the identifying data obtained from reading, copying or scanning the identification credentials in the appropriate profile in the database 116.

Alternatively, and according to yet another embodiment of the invention, the exit management system 120 may be capable of accessing an outside catalog of iris images created and maintained by a third party in order to locate a match for the captured iris images of an individual. In that case, if a match was located, the exit management system could automatically populate the individual's profile with the identifying information associated with the matching iris images in the outside catalog. As this process is automated, it would avoid the need for manual entry of at least some data, although the exit manager may confirm that the populated data is consistent with forms of identification provided by the individual in person.

In addition, according to some embodiments of the present invention, the iris scanning device 112 and/or the code reading device 118 is further configured to record the date and time at which each iris image and/or the identification code was captured and according to other embodiments, the exit management system 120 is configured to record the date and time at which the physical item is actually granted or denied entry or exit. This data may be transmitted with the iris images and/or the identification codes and stored in the database 116 such that a "storage log" is contained in or related to each stored profile, detailing the particular physical item was checked in and out by the authorized custodian(s).

This log may date back as long as the exit manager determines, and the exit management system 120 may be configured to delete from the database 116 data relating to storage events logged a certain amount of time in the past. The storage log is advantageous as it allows the exit manager to quickly verify whether a particular physical item is currently stored in the facility. Furthermore, the storage log could be used for other purposes, such as determining the number hours/days the physical item was stored at the facility in a given period and/or the particular days the physical item was stored in the facility for billing purposes. Indeed, in accordance with one embodiment, a debit card, account number, or other payment mechanism may be included in the profile of the physical item or the authorized custodian, and may be automatically charged at predetermined times based on the data included in the storage log.

With reference to FIG. 3, a schematic 300 of another exemplary physical item security system 302 is provided. The physical item security system 302, according to an embodiment, tracks a physical item 306 by concealing a tracking device 310 in the physical item and activates the tracking device 310 in the event the physical item 306 is removed from a controlled area 312, or accessed without authorization. The schematic 300 illustrates a top view of the controlled area 312, which includes an entrance/exit 316 and inner and outer sensors 320, 324. The controlled area 312, for example, could be a drop box for storing physical items, such as money, or a bank vault for storing valuable physical items, such as confidential legal documents. The inner sensor 320 is located proximate to the entrance/exit 316, which is sometimes referred to as the perimeter 316, of the controlled area 312, and the outer sensor 324 is located between the inner sensor 320 and the entrance/exit 316.

In the event the controlled area 312 is a drop box, the exit/entrance 316 is used only as an entrance, not an exit. This is because some drop boxes are equipped with a second door through which the physical items are removed. Other drop boxes are mounted to the wall of a bank. When physical items are deposited through the entrance of the wall-mounted drop box, the items fall into a basket, which is located inside of the bank. In this case, the entrance/exit 316 only needs to serve as an entrance because bank employees can simply reach into the basket and remove the physical items.

The physical item security system 302 is configured to detect when an individual attempts to remove the physical item 306 from the controlled area 312. To do so, according to one embodiment, the physical item security system 302 monitors the sequence of encounters that the physical item 306 has with the inner and outer sensors 320, 324. This can be accomplished in a number of ways. For example, in one embodiment, a processor 328 is provided in tracking device 310 and configured to activate the tracking device 310 in the event the tracking device 310 encounters the inner sensor 320 and then the outer sensor 324. This sequence of encounters indicates that the physical item 306 is being removed from the controlled area 312 via exit 316.

However, the processor 328 is not configured to activate the tracking device 310 if the tracking device 310 encounters the outer sensor 324 and then the inner sensor 320, because this sequence of encounters indicates that the physical item 306 is being inserted into the controlled area 312 via the entrance/exit 316. Also, in some embodiments, the processor 328 is configured not to activate the tracking device 310 if the tracking device 310 encounters the outer sensor 324 twice without ever encountering the inner sensor 320, because this sequence of encounters indicates that the physical item 306 was partially inserted into the entrance/exit 316 and then withdrawn.

Accordingly, in the previously described embodiment, movement of the physical item 306 into the controlled area 312 via exit/entrance 316 will not cause the processor 328 to activate the tracking device 310. However, movement of the physical item 306 out of the controlled area 312 via exit/entrance 316 will cause the processor 328 to activate the tracking device 310.

Instead of embedding the processor 328 in the tracking device 310, as described above, some embodiments of the present invention provide a remote processing system in communication with the tracking device and/or the inner and outer sensors 320, 324. Like the embedded processor 328, the remote processing system monitors the sequence encounter between the tracking device 310 and the inner and outer sensors 320, 324 to determine whether the physical item is being removed from the controlled area 312 via the entrance/exit 316.

In some embodiments, instead of immediately activating the tracking device 310 when the physical item 306 encounters the inner sensor 320 and then the outer sensor 324, the processor 328 is configured to delay activation of the tracking device 310. During this delay, the individual who removed the physical item from the controlled area 312 can prevent activation of the tracking device 310 by moving the physical item 306 into proximity with a deactivation sensor 330 and thereby causing tracking device 310 to encounter a deactivation sensor 330, which is also referred to herein as the third sensor 330. When the tracking device 310 encounters the deactivation sensor 330, the processor 328 is configured to prevent the tracking device 310 from activating. This embodiment is useful for controlled areas 312 such as bank vaults. For example, authorized bank employees can be provided information about the location and purpose of the deactivation sensor 330. Accordingly, upon removing the physical item 306 from the vault 312, the bank employee can deactivate the tracking device 310. It should also be appreciated that, if the tracking device 310 is accidentally activated, the deactivation sensor 330 can be used to deactivate the tracking device 310.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for tracking the geographic location of a physical item that is stored in a controlled area and then later removed from the controlled area, the system comprising:
the controlled area comprising:
a perimeter;
an inner opening formed in said perimeter;
an entrance comprising an elongated body, wherein one end of said elongated body is connected to the inner opening and an opposing end of said elongated body has an outer opening;
an inner sensor located at a position adjacent to the inner opening and on an opposite side of said inner opening than said entrance;
an outer sensor located inside the elongated body of the entrance and on an opposite side of said inner opening than said inner sensor such that said inner sensor and said outer sensor are located on opposite sides of said inner opening; and
a tracking device associated with the physical item, wherein the tracking device is triggered when the physical item passes by the inner sensor first and then the outer sensor second indicating that the physical item is being removed from the controlled area via the entrance,
wherein the controlled area is at least one of a drop box, safe, vault, and safe box.

2. The system of claim 1, wherein the tracking device is configured to activate immediately after being triggered.

3. The system of claim 1, wherein the tracking device, after being triggered, is configured to delay a period of time before activating.

4. The system of claim 3, further comprising:
a deactivation sensor configured to prevent the tracking device that has already been triggered, but has yet to activate, from activating.

5. The system of claim 1, further comprising:
a deactivation sensor configured to deactivate the tracking device in the event the tracking device has already been activated.

6. The system of claim 1, wherein the tracking device is not triggered when the physical item is deposited into the controlled area via the entrance because, when deposited via the entrance, the physical item passes by the outer sensor and then the inner sensor.

7. The system of claim 1, wherein the controlled area comprises a basket located inside of a building.

8. The system of claim 7, wherein the tracking device is triggered when the physical item is removed from the basket via the entrance because, when removed via the entrance, the physical item passes by the inner sensor and then the outer sensor.

9. The system of claim 7, wherein the tracking device is not triggered when the physical item is deposited into the basket via the entrance because, when deposited via the entrance, the physical item passes by the outer sensor and then the inner sensor.

10. The system of claim 1, wherein the tracking device is triggered when the physical item is removed from the safe via the entrance because, when removed via the entrance, the physical item passes by the inner sensor and then the outer sensor.

11. The system of claim 10, wherein the tracking device is not triggered when the physical item is deposited into the safe via the entrance/exit because, when deposited via the entrance/exit, the physical item passes by the outer sensor and then the inner sensor.

12. The system of claim 1, wherein the tracking device is concealed inside of the physical item.

13. The system of claim 1, wherein the tracking device is concealed inside of a band that bundles a stack of paper money.

14. The system of claim 1, wherein the tracking device is concealed inside of a coin sleeve.

15. A method of tracking the geographic location of a physical item that is stored in a controlled area and then later removed from the controlled area, the method comprising:
associating a tracking device with the physical item;
wherein the controlled area comprises:
a perimeter;
an inner opening formed in said perimeter;
an entrance comprising an elongated body, wherein one end of said elongated body is connected to the inner opening and an opposing end of said elongated body has an outer opening;
communicating with an inner sensor located at a position adjacent to the inner opening and on an opposite side of said inner opening than said entrance;
communicating with an outer sensor located inside the elongated body of the entrance and on an opposite side of said inner opening than said inner sensor such that said inner sensor and said outer sensor are located on opposite sides of said inner opening; and triggering the tracking device when the physical item passes by the inner sensor first and then the outer sensor second indicating that the physical item is being removed from the controlled area via the entrance, wherein the controlled area is at least one of a drop box, safe, vault, and safe box.

16. The method of claim 15, wherein the tracking device is configured to activate immediately after being triggered.

17. The method of claim 15, wherein the tracking device, after being triggered, is configured to delay a period of time before activating.

18. The method of claim 17, further comprising:
providing a deactivation sensor that is configured to prevent the tracking device that has already been triggered from activating.

19. The method of claim 15, further comprising:
providing a deactivation sensor configured to deactivate the tracking device in the event the tracking device has already been activated.

20. A system for tracking the geographic location of a physical item that is stored in a controlled area and then later removed from the controlled area, the system comprising:
an input system;
a tracking device associated with the physical item;
the controlled area comprising:
  a perimeter;
  an inner opening formed in said perimeter;
  an entrance comprising an elongated body, wherein one end of said elongated body is connected to the inner opening and an opposing end of said elongated body has an outer opening;
an inner sensor in communication with the input system and located at a position adjacent to the inner opening and on an opposite of said inner opening than said entrance, wherein the inner sensor is configured to send an inner-position signal to the input system when the tracking device of the physical item passes by the inner position;
an outer sensor located inside the elongated body of the entrance on an opposite side of said inner opening than said inner sensor such that said inner sensor and said outer sensor are located on opposite sides of said inner opening, wherein the outer sensor is configured to send an outer-position signal to the input system when the tracking device of the physical item passes by the outer position;
a processing system in communication with the input system and configured to process the sequence of the inner- and outer-position signals and to generate an activation signal when the tracking device of the physical item passes by the inner position first and then passes by the outer position second indicating that the physical item is being removed from the controlled area via the entrance; and
an output system in communication with the processing system and configured to send the activation signal to the tracking device,
wherein the controlled area is at least one of a drop box, safe, vault, and safe box.

21. The system of claim 20, wherein the processing system is configured to generate the activation signal immediately when the tracking device of the physical item passes by the inner position and then passes by the outer position.

22. The system of claim 20, wherein the processing system, after the tracking device of the physical item passes by the inner position and then passes by the outer position, is configured to delay a period of time before generating the activation signal.

23. The system of claim 20, further comprising:
a deactivation sensor in communication with the input system and configured to send an deactivation signal to the input system when the tracking device is in a position proximate to the deactivation sensor, wherein the deactivation signal prevents the tracking device that has already been triggered, but has yet to activate, from activating.

24. The system of claim 23, wherein the deactivation signal deactivates the tracking device in the event the tracking device has already been activated.

25. The system of claim 1, further comprising at least a second tracking device associated with the physical item, wherein each of the first tracking device and the second tracking device is activated sequentially.

* * * * *

UNITED STATES PATENT AND TRADEMARK OFFICE
CERTIFICATE OF CORRECTION

PATENT NO. : 8,502,644 B1
APPLICATION NO. : 12/362313
DATED : August 6, 2013
INVENTOR(S) : Kurt D. Newman et al.

It is certified that error appears in the above-identified patent and that said Letters Patent is hereby corrected as shown below:

Title page, item (73), replace "Bank of American Corporation'" with --Bank of America Corporation--.

Signed and Sealed this
Seventeenth Day of September, 2013

Teresa Stanek Rea
*Deputy Director of the United States Patent and Trademark Office*